United States Patent [19]
Raterman et al.

[11] Patent Number: 5,524,828
[45] Date of Patent: *Jun. 11, 1996

[54] APPARATUS FOR APPLYING DISCRETE FOAM COATINGS

[75] Inventors: John Raterman, Lawrenceville, Ga.; Jurgen Benecke; Arthur Cieplik, both of Luneburg, Germany; Thomas Burmester, Bleckede, Germany; Michael L. Gill, Westlake, Ohio

[73] Assignee: Nordson Corporation, Westlake, Ohio

[*] Notice: The term of this patent shall not extend beyond the expiration date of Pat. No. 5,429,840.

[21] Appl. No.: 400,663

[22] Filed: Mar. 8, 1995

Related U.S. Application Data

[62] Division of Ser. No. 250,099, May 26, 1994, Pat. No. 5,429,840, which is a continuation of Ser. No. 910,768, Jul. 8, 1992, abandoned.

[51] Int. Cl.$^6$ ............................. B05B 7/16; B05B 7/00
[52] U.S. Cl. .............................. 239/413; 239/424.5
[58] Field of Search ............................. 239/296, 297, 239/299, 412, 413, 424.5, 424, 423, 418, 429, 433, 568, 549, 553, 553.5, 563, 562; 425/7, 72.2, 382.2

[56] References Cited

U.S. PATENT DOCUMENTS

| | | | |
|---|---|---|---|
| Re. 33,481 | 12/1990 | Ziecker et al. | 239/298 |
| 3,199,787 | 8/1965 | James | 239/423 |
| 3,595,204 | 7/1971 | McIntyre | 239/70 |
| 3,750,955 | 8/1973 | Nakai et al. | 239/420 |
| 3,806,289 | 4/1974 | Schwarz | 425/72 |
| 3,825,379 | 7/1974 | Lohkamp et al. | 425/72 |
| 3,972,759 | 8/1976 | Buntin | 156/167 |
| 4,047,861 | 9/1977 | Balaz | 425/7 |
| 4,059,714 | 11/1977 | Scholl et al. | 428/310 |
| 4,128,667 | 12/1978 | Timson | 427/348 |
| 4,133,970 | 1/1979 | Lusk | 174/19 |
| 4,156,398 | 5/1979 | McDaniel | 118/313 |
| 4,247,581 | 1/1981 | Cobbs, Jr. et al. | 427/373 |
| 4,408,562 | 10/1983 | DeCamp et al. | 118/324 |
| 4,476,165 | 10/1984 | McIntyre | 427/258 |
| 4,553,701 | 11/1985 | Rehman et al. | 239/432 |
| 4,687,137 | 8/1987 | Boger et al. | 239/124 |
| 4,714,647 | 12/1987 | Shipp, Jr. et al. | 428/212 |
| 4,720,252 | 1/1988 | Appel et al. | 425/4614 |
| 4,735,169 | 4/1988 | Cawston et al. | 118/411 |
| 4,746,545 | 5/1988 | McIntyre | 427/176 |
| 4,750,956 | 6/1988 | Malachowski | 156/79 |
| 4,753,819 | 6/1988 | Shimada | 427/96 |
| 4,774,109 | 9/1988 | Hadzimihalis et al. | 427/286 |
| 4,778,631 | 10/1988 | Cobbs, Jr. et al. | 261/128 |
| 4,815,660 | 3/1989 | Boger | 239/8 |
| 4,818,464 | 4/1989 | Lau | 264/510 |
| 4,822,640 | 4/1989 | Tuhkanen et al. | 427/211 |
| 4,836,440 | 6/1989 | French | 229/132 |

(List continued on next page.)

FOREIGN PATENT DOCUMENTS

| | | |
|---|---|---|
| 329813 | 8/1989 | European Pat. Off. . |
| 1100463 | 12/1989 | European Pat. Off. . |
| 2824403 | 12/1979 | Germany . |

OTHER PUBLICATIONS

"The Waistband Phenomenon" article; no date.

*Primary Examiner*—Andres Kashnikow
*Assistant Examiner*—Lesley D. Morris
*Attorney, Agent, or Firm*—Wood, Herron & Evans

[57] ABSTRACT

Apparatus for producing intermittent, discrete patterns of foam coating material, onto discrete substrates or substrate areas, where the patterns have sharp, square leading and trailing edges, as well as side edges. A slot nozzle die has elongated air slots along the slot extrusion opening. Air flow is initiated from both air slots prior to the initiation of the foam flow. Also, the air flow is continued beyond that point in time when the foam flow ceases. The delays between the operations of the air flow and the foam coating flow are on the order of micro seconds. Alternatively, the lead and lag air start and stop times on each side of the foam coating material are different to control the exact disposition of the square cut-on and square cut-off coating edge on the substrate.

15 Claims, 5 Drawing Sheets

U.S. PATENT DOCUMENTS

| | | | |
|---|---|---|---|
| 4,850,514 | 7/1989 | Scholl et al. | 222/146.5 |
| 4,874,451 | 10/1989 | Boger et al. | 156/291 |
| 4,880,663 | 11/1989 | Shimada | 427/96 |
| 4,891,249 | 1/1990 | McIntyre | 427/421 |
| 4,894,277 | 1/1990 | Akasaki | 428/198 |
| 4,900,593 | 2/1990 | Krippl | 427/420 |
| 4,906,492 | 3/1990 | Groshens | 427/148 |
| 4,957,783 | 9/1990 | Gabryszewski | 427/424 |
| 4,983,109 | 1/1991 | Miller et al. | 425/7 |
| 4,983,424 | 1/1991 | Saidman et al. | 427/243 |
| 4,984,949 | 1/1991 | Reckziegel | 412/8 |
| 5,000,112 | 3/1991 | Rothen et al. | 118/411 |
| 5,012,980 | 5/1991 | Viannaay et al. | 239/423 |
| 5,016,812 | 5/1991 | Pedigrew | 239/132 |
| 5,080,569 | 1/1992 | Gubernick et al. | 425/7 |
| 5,145,689 | 9/1992 | Allen et al. | 425/72.2 |
| 5,209,410 | 5/1993 | Wichmann et al. | 239/568 |
| 5,236,641 | 8/1993 | Allen et al. | 425/66 |
| 5,260,003 | 11/1993 | Nyssen et al. | 425/7 |
| 5,269,670 | 12/1993 | Allen et al. | 425/72.2 |
| 5,286,182 | 2/1994 | Maeda et al. | 425/7 |
| 5,354,378 | 10/1994 | Hauser et al. | 239/299 |
| 5,421,921 | 6/1995 | Gill et al. | 425/7 |

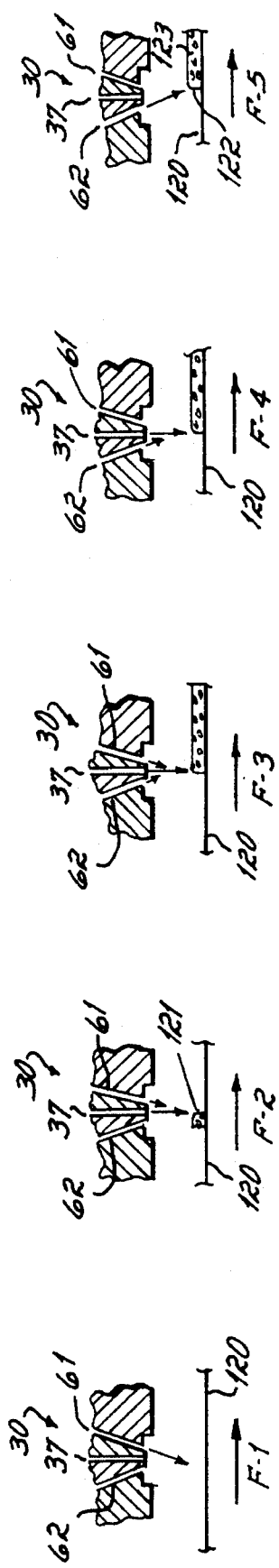
FIG. 5
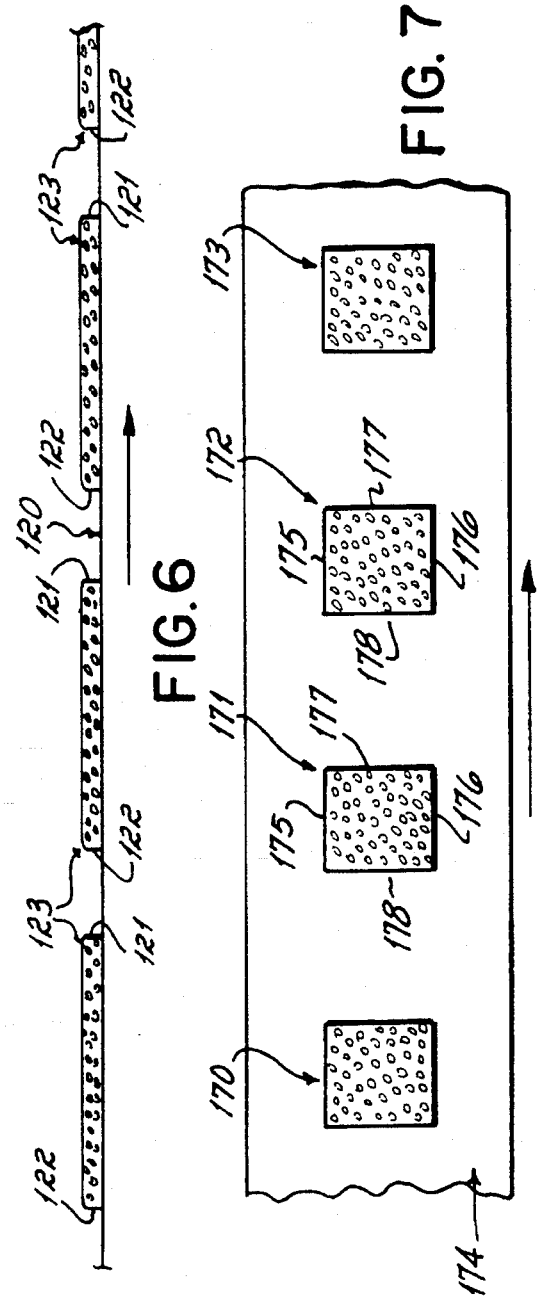
FIG. 6
FIG. 7

APPARATUS FOR APPLYING DISCRETE FOAM COATINGS

This application is a divisional of application Ser. No. 08/250,099, filed May 26, 1994, now U.S. Pat. No. 5,429,840, which is a file wrapper continuation of U.S. Ser. No. 07/910,768 filed on Jul. 8, 1992, now abandoned.

This case is generally related to the following United States Patent Applications filed on even date herewith:

Apparatus & Methods for Applying Discrete Coating Ser. No. 07/910,781, now abandoned in favor of a pending continuation application, U.S. Ser. No. 08/224,426, filed Apr. 8, 1994, now U.S. Pat. No. 5,423,935 J. Benecke; A. Cieplik; T. Burmester Segmented Slot Die for Air Spray of Fibers Ser. No. 07/910,784 now U.S. Pat. No. 5,421,921 M. Gill; J. Benecke; A. Cieplik; T. Burmester Methods & Apparatus for Applying Coatings to Bottles U.S. Pat. No. 5,34,378 L. Hauser; J. Benecke; A. Cieplik; T. Burmester; M. Gill; K. Washington; R. Evans Apparatus & Methods for Applying Conformal Coatings to Electronic Circuit Boards Ser. No. 07/910,782, now abandoned, in favor of a pending continuation application, U.S. Ser. No. 08/259,818, filed Jun. 15, 1994, now U.S. Pat. No. 5,409,733 B. Boger; J. Benecke; A. Cieplik; T. Burmester; M. Gill Apparatus & Methods for Intermittently Applying Discrete Adhesive Coatings Ser. No. 07/911,674 now U.S. Pat. No. 5,418,009 J. Raterman; J. Benecke; A. Cieplik; T. Burmester; M. Gill Such applications are all commonly assigned and are expressly incorporated herein by reference.

This invention relates to the application of coatings to substrates and more particularly to the application to substrates of discrete, uniform foam coatings having sharp, square cut-on and cut-off edges.

Many industrial applications require the use of discrete, well defined and uniform foam coatings applied to predetermined areas. Such coatings are very useful in varied lamination processes, such as, for example, in box flap sealing, application of foam to non-uniform surfaces, application of cushions of adhesive material onto substrates, and in other coating operations.

In the production of discrete foam coatings and adhesives for lamination of discrete substrate areas, for example, it is desirable to obtain broad, uniform foam coatings in a non-contact application process with sharp and square cut-on and cut-off edges with no stringing of material. None of the processes currently known are entirely suitable for this application.

Many various devices have been used to apply foamed adhesives or coatings for lamination. Prior contact coaters present the inherent disadvantage of wear and substrate index and tension tolerances. Other foam producing devices use air flow to atomize or break up the foam prior to substrate contact.

When used in carton or box flap sealing operations, prior adhesive foaming devices require special bracketry to mount the foam nozzles so they can be retracted and introduced alternately, to the substrate.

While prior foam devices have proved useful in particular applications, it is now desirable to provide apparatus and methods for producing discrete foam coatings onto predetermined substrate areas.

Accordingly, it has been one objective of this invention to produce broad, uniform, foamed adhesive coatings with sharp side edges and sharp, square leading and trailing edges on intermittently presented discrete substrate areas.

Another objective of this invention has been to provide methods and apparatus for intermittent non-contact application of foamed thermoplastic coating material, having sharp and square side, leading and trailing edges, to discrete, predetermined areas.

Another objective of the invention has been to provide slot nozzle apparatus and methods for producing broad, uniform discrete foam coatings having sharp, square, side, leading and trailing edges.

To these ends, a preferred embodiment of the invention includes a slot nozzle, elongated air channels on each side of the slot nozzle for impinging a flow of air on each side of an expanse of foam coating material extruding or emanating from the slot nozzle, and means for controlling the supply of foam material to the slot nozzle and the supply of air to the air channels so that each can be initiated and stopped at predetermined intervals to produce sharp, square leading and trailing edges in the deposited coatings.

In one mode, the air start-up on both sides precedes extrusion start-up and continues until after the extrusion is stopped. In another mode, the air on one side of the nozzle is started before extrusion is started and terminates before extrusion is stopped while air on another side of the nozzle starts after extrusion start-up and continues until after extrusion stops.

Continuation of air flow after extrusion stoppage can draw foam material remaining at or in the nozzle into the air stream and onto a substrate, causing stringing. Accordingly, the delay of air stoppage after extrusion stoppage is predetermined to produce good sharp, square coating pattern cut-off, but not so long as to draw remaining foam material at the nozzle therefrom so as to cause stringing. The air start-up and stop delays are preferably on the order of micro-seconds.

The invention produces uniform, wide or broad foam coatings having sharp side edges and sharp, square, leading and trailing edges coordinated with a predetermined underlying substrate area and applied in a non-contacting application process.

BRIEF DESCRIPTION OF THE DRAWINGS

These and other objectives and advantages will become readily apparent from the following detailed description of a preferred embodiment of the invention and from the drawings in which:

FIG. 5 is a diagrammatic view illustrating use of one embodiment of the invention in a discrete foam coating application;

FIG. 6 is a side view of a substrate with discrete foam coatings disposed thereon in accordance with the invention; and FIG. 7 illustrates square foam patterns attainable by the invention.

DETAILED DESCRIPTION OF THE INVENTION

Figure 1:
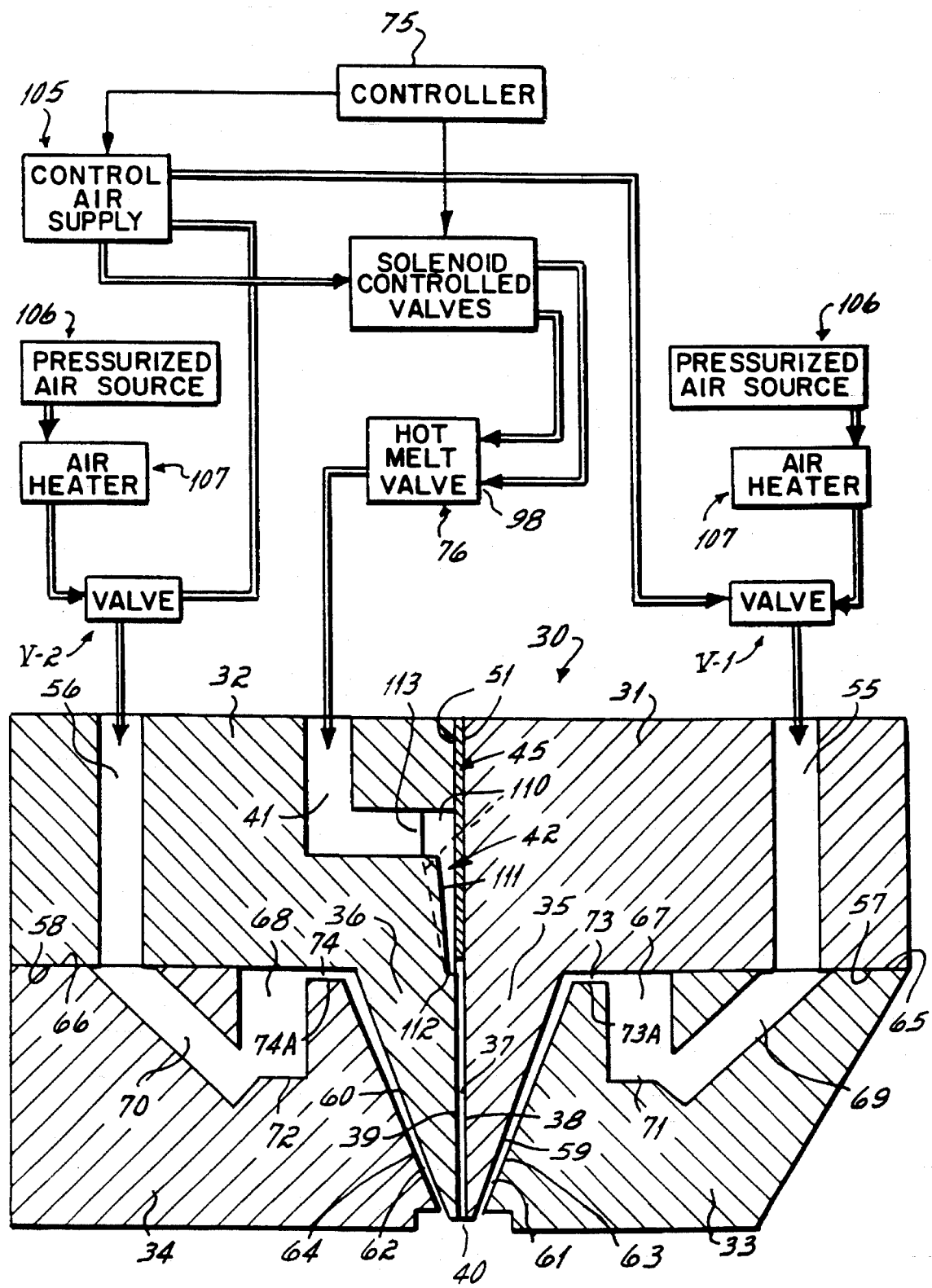
FIG. 1 is a diagrammatic side view in partial cross-section illustrating the invention.

Turning now to the drawings, there will now be described the apparatus for generating discrete, uniform foam coatings having sharp and square cut-on and cut-off edges. FIG. 1 illustrates various features of a die means 30 and air and foam material controls according to the invention. The die means 30 comprises two die halves 31, 32, and two air blocks 33, 34. Each die half 31, 32 includes a downwardly depending projection 35, 36. The die halves 31, 32 define between them an extrusion slot 37. Slot 37 is defined by the face 38 of the die half 31 and the face 39 of the die half 32. Face 38 is juxtaposed with respect to the face 39, as shown. The extrusion slot 37 terminates at an elongated slot nozzle or extrusion outlet 40.

As noted in the Figures, the air blocks extend below the outlet 40 to provide a degree of protection from mechanical damage.

Figure 4:
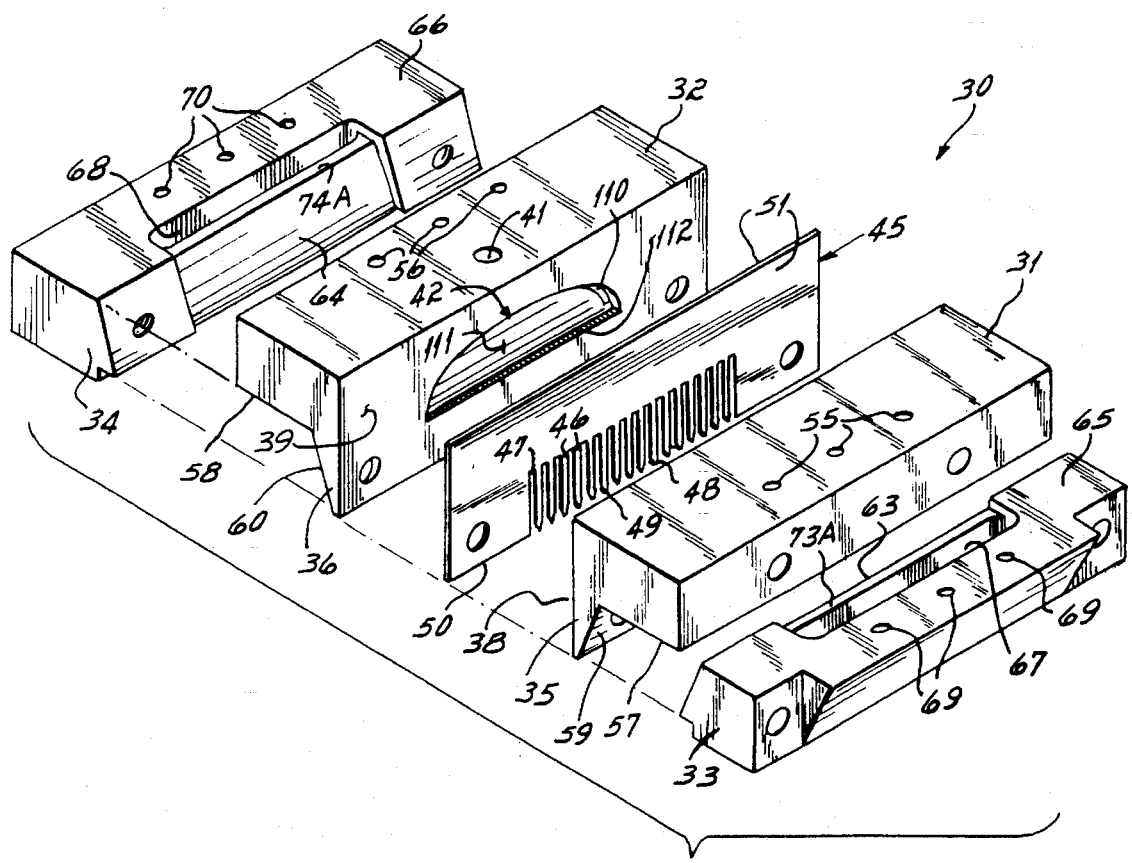
FIG. 4 is an exploded view of the slot nozzle die of FIG. 2.

Die half 32 includes a passageway 41 for receiving foam material and conducting the material to a "coat hanger" portion 42 of the die half 32, details of which are perhaps better seen in FIG. 4. A segmented shim 45, as best seen in FIG. 4, and a portion of which is seen in FIG. 1, is located between the juxtaposed surfaces 38 and 39 of the die halves 31 and 32. The shim 45 has a plurality of elongated projections 46, defining between them a plurality of elongated channels or slots 47.

Figure 4A:
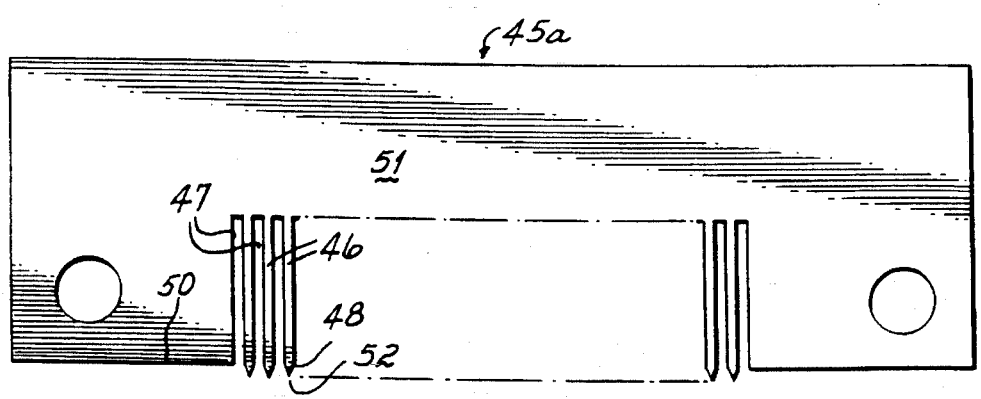
FIG. 4A is a partial view of an alternative shim to that shown in FIG. 4.

Each of the projections has a downstream tapered end portion 48, having a preferably sharp tip 49 which is preferably flush with the lower edge 50 of the shim, and flush with the elongated slot nozzle extrusion outlet 40 (FIG. 1). In FIG. 1, only the top portion 51 of the shim 45 is shown, for the purpose of clarity. In an alternative shim 45a (FIG. 4A) pointed tips 52 extend shortly beyond outlet 40 by preferably two or three thousandths of an inch. Also, it will be appreciated that an open, non-segmented shim could be used.

Returning now to FIG. 1, each of the upper die halves 31, 32 is provided with an air passageway 55, 56, extending from an upper surface of the die to a lower respective surface 57, 58. Each die half 31, 32 also includes an inclined surface 59, 60, depending from the surfaces 57 and 58, respectively. The inclined surfaces 59 and 60 define one part of an air passage, or air slot 61 and 62, as will be described.

Turning now to the air blocks 33 and 34, it will be appreciated that each of them include an inclined surface 63 and 64, respectively, which define the other side of the air slots 61 and 62 with the juxtaposed respective surfaces 59, 60, all as shown in FIG. 1. Each of the air blocks 33 and 34 include an upper surface 65, 66 juxtaposed to the respective lower surfaces 57 and 58 of the die halves 31, 32.

An elongated air plenum 67, 68 is formed in each of the air blocks 33, 34. The plenums 67, 68 are also seen in FIG. 4. Respective air passages 69 and 70 are formed in the respective air blocks 33 and 34 and extend from the respective surfaces 65 and 66 to a lower portion 71, 72 of the respective plenums 67, 68. Each of the plenums 67, 68 are primarily defined in the air blocks 33 and 34. However, when the die means 30 are assembled, the top area of each of the respective plenums 67, 68 are defined respectively by the lower surfaces 57 and 58 of the die halves 31, 32. These surfaces 57, 58 also form an upper portion of air passage 73 and 74, each of which respectively lead from their associated plenums 67 and 68 to the air slots 61 and 62. Accordingly, looking at the right hand side of FIG. 1, it will be appreciated that air can pass through the passageway 55 to the passageway 69 in air block 33, and from there to the plenum 67. "O"-rings, not shown, can be used at the interfaces of the respective die half and air block to seal passageways 55, 56 with passageways 69, 70, respectively. Pressurized air in the plenum 67 moves through the passage 73 into the air slot 61.

In a like manner, air can be introduced to passage 56 in the die half 32 and from there it can move into the air passage 70 and into the lower portion of the plenum 68. From the plenum 68, pressurized air is directed through the air passage 74 into the air slot 62 of the air block 34.

Referring now briefly to the upper portion of FIG. 1, it will be appreciated that a controller 75 is operationally connected to valves V-1 and V-2, as shown, for controlling the introduction of heated, pressurized air to the passageways 55 and 56, respectively, in order to pressurize those passageways and the downstream air passages as previously described, with air. At the same time, the controller 75 is operationally interconnected to a foam material control valve 76 for controlling the supply of coating material to the material passageway 41 and to the internal coat hanger area 42 of the die means 30. While any suitable form of controller 75 can be used, as is well known, one particular controller comprises a PC-10 pattern controller, manufactured by Nordson Corporation of Westlake, Ohio. The PC-10 pattern control 75 is operational to initiate and to stop the generation of air into passageways 55 and 56, either simultaneously or independently, and also to initiate and to stop the flow of foam material flowing through valve 76 so as to intermittently provide coating material to the passageway 41 independently and at pre-selected times with respect to the provision of pressurized heated air to the passageways 55 and 56, all in a manner as will be described.

The air slots 61 and 62 are oriented on an angle with respect to the elongation of the extrusion slot 37. Accordingly, when foaming coating material is extruded through the slot 37 and outwardly of the extrusion outlet 40, air moving through the air slots 61 and 62 is impinged on the material before that material engages or is deposited on an underlying substrate which is presented for coating.

Figure 2:
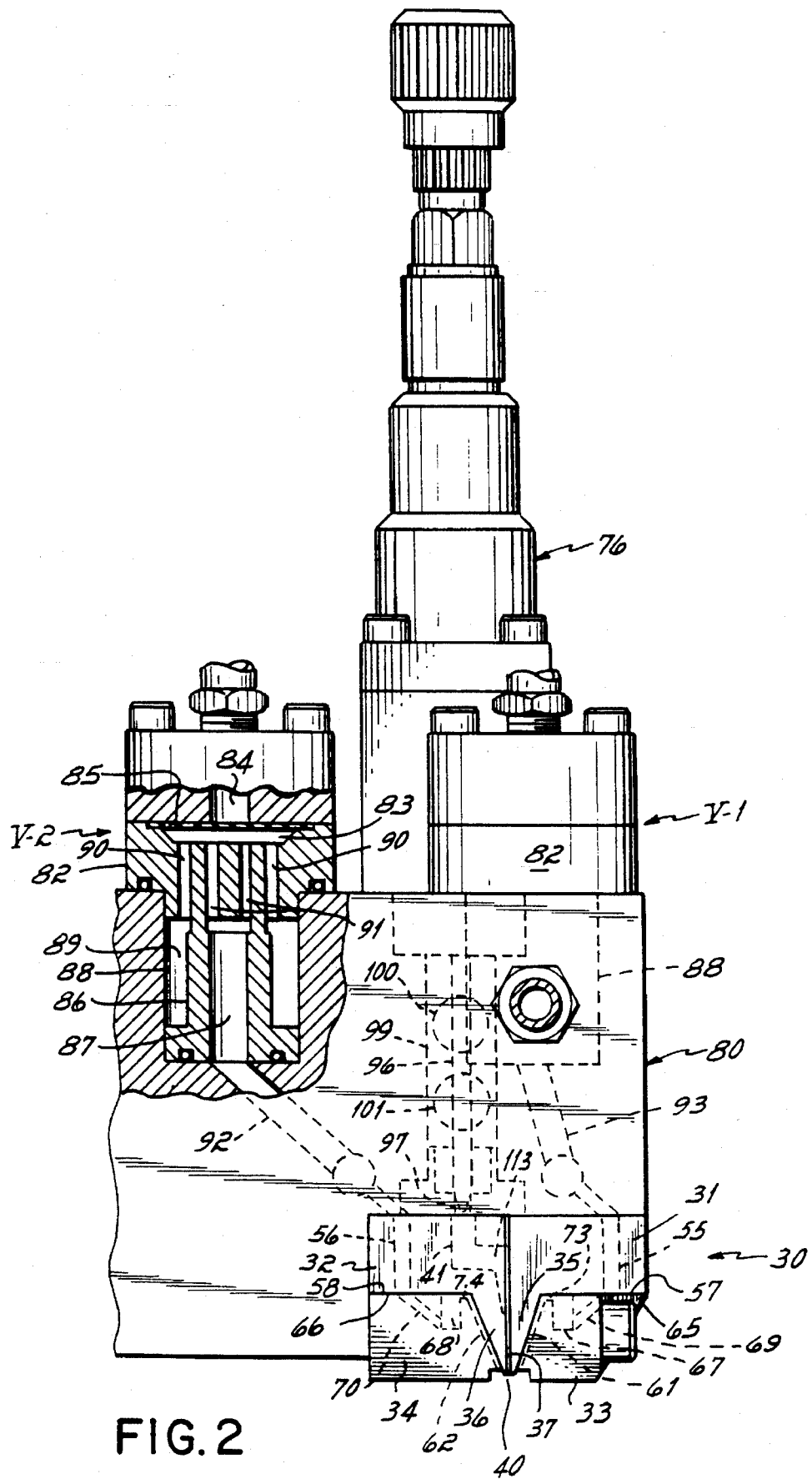
FIG. 2 is an elevational side view in partial cross section of a slot nozzle coater according to the invention.
Figure 3:
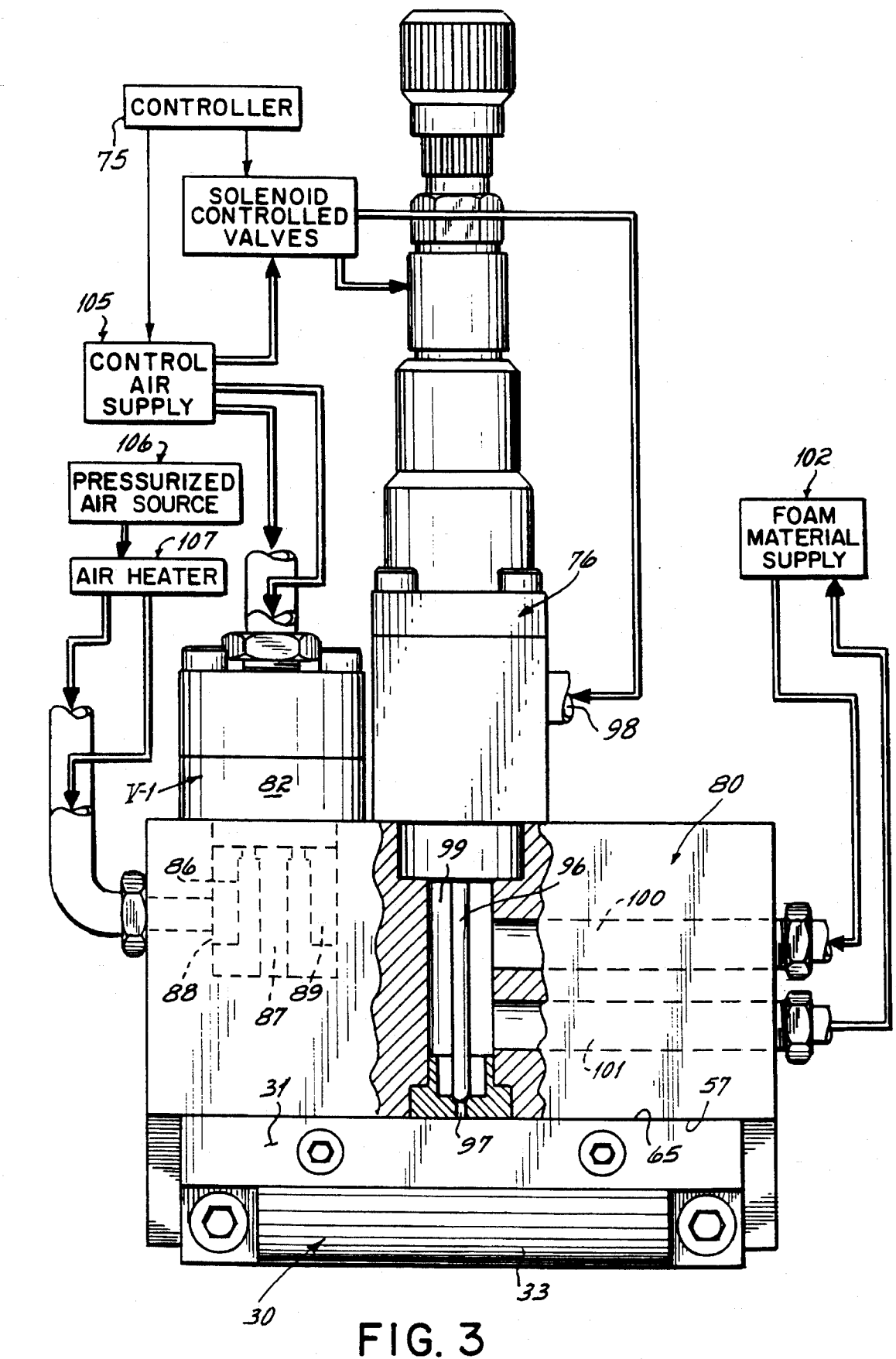
FIG. 3 is an elevational front view in partial cross-section of the apparatus of FIG. 2, illustrating diagrammatically control and flow features of the invention.

Turning now to FIGS. 2 and 3, there is shown more of the overall extrusion apparatus according to the invention. As shown in FIG. 2, the die means 30 is interconnected with air valves V-1, V-2 and foam material valve 76, each of which is interconnected with an extrusion body 80 which operationally interconnects the air and foam material valves with the die means 30.

For clarity, a portion of the air valve V-2 is shown in partial cross section in FIG. 2. Since the valves V-1 and V-2 are identical, only valve V-2 will be described. Such air valves are manufactured and distributed by Nordson Corporation, through Nordson Engineering of Luneburg, Germany, under part no. 265701. Any suitable air valve other than these can be used.

Valve V-2 comprises a valve body 82 defining a valve chamber 83 and a control chamber 84, the two chambers being separated by the diaphragm 85. An extension 86 having a bore 87 extending therethrough depends from the valve body S2 and extends into the bore 88 of extrusion body 80 to form an annular chamber 89 therewith. Chamber 89 is interconnected with an annular passageway 90 in the valve body 82, which interconnects with the chamber 83. An annular chamber 91 is also defined in the valve body 82 and interconnects with the chamber S3. When control air is directed into chamber 84, the diaphragm 85 is pushed downwardly to seal off the annular passageway 90 from the annular chamber 91. On the other hand, when pressure is decreased in the control chamber 84, the diaphragm moves upwardly to the position shown in FIG. 3. Air in the inlet annular chamber S9, which is heated and under pressure, communicates through the annular passageway 90 through the chamber 83 and the annular chamber 91, into the outlet bore 87. Outlet bore 87 is connected through a passageway 92 to the air passageway 56 in the upper die half 32, as shown in detail in FIG. 1, where the air from there can move to the plenum 68 and into the air slot 62.

In like manner, the air valve V-1 is operable to selectively supply air to the air passageway 93 in the extrusion body 80 and from there to the air passageway 55 in the upper die half 31. Air moves through that passageway 55 into the plenum 67 and from there to the air slot 61.

The foam material valve 76 can be any suitable fluid material valve which can be selectively controlled to initiate and to cut off the flow of coating material, such as foam, to the die means 30. One such suitable valve is balanced valve model no. EP51 produced by Nordson Corporation of Westlake, Ohio. Such valve minimizes significant change in pressures when the valve is switched between its opened and closed positions. The valve 76 has a stem 96 seated over a port 97. When control air is supplied to an inlet 98, the stem 96 is lifted to permit foam material in a chamber 99 to flow through the port 97 and into the passageway 41 of the upper die half 32. Foam material is introduced into the chamber 99 through inlet 100. An outlet 101 is also interconnected with the chamber 99 to receive pressurized foam material when the stem 96 is seated on port 97.

Any suitable apparatus can be utilized for supplying foam material to the valve 76. Such apparatus is shown diagrammatically at 102. While any suitable apparatus could be utilized, one particular form of apparatus which is suitable is the FoamMelt® System, currently manufactured by Nordson Corporation of Westlake, Ohio. Another suitable apparatus is the FoamMix® System manufactured by that same company. See for example, U.S. Pat. Nos. 4,059,714 and 4,778,631, both expressly incorporated herein, describing such systems.

FIG. 3 illustrates diagrammatically the various control inputs to the valves 76 and V-1. As shown in FIG. 3, the controller 75 is interconnected to a control air supply 105 for supplying control air to the valves V-1 and V-2. A pressurized air source 106 is interconnected to an air heater 107 which supplies process air to the valves V-1 and V-2 for transmission to the respective air slots 61, 62, as described above. When the respective valves V-1 and V-2 are opened, controller 75 is also interconnected to the control air supply for supplying control air through closed and opened solenoid control valves (shown in FIG. 3) to open and close the foam valve 76.

Referring now more particularly to FIG. 1 and the details of the die means 30 as shown in FIG. 4, it will be appreciated that the plenums 67 and 68 in the air blocks 33, 34 communicate with the lower surfaces 73A and 74A, respectively, of the air passageways 73 and 74 as previously described, and air emanating from the upper portion of the plenums 67 and 68 moves through the passageways 73 and 74 and then downwardly through the respective air slots 61, 62.

Turning now to the so-called "coat hanger" portion 42 of the upper die half 32, and with reference to FIG. 4, it will be appreciated that "coat hanger" dies are known in general. For example, one coat hanger-type die for handling hot melt adhesive is disclosed in U.S. Pat. No. 4,687,137, expressly incorporated herein by reference. The difference in that structure is that it serves a plurality of die outlets, and not a continuous extrusion slot die as noted herein. While such a die could be used herein, nevertheless, the present die means 30 incorporates a "coat hanger" portion 42 having an arcuate slot or groove of increasingly shallow dimension 110 communicating with an incline surface 111. Surface 111 is inclined such that its lower portion, where it meets bottom surface 112, is closer to the plane of the face 39 than is the upper portion. It will also be appreciated that slot 110 is of decreasing depth as its distance from port 113 continues until it flows unbroken in surface 111.

The arcuate slot 110 of decreasing depth is fed by the foam material port 113, which is interconnected to the passageway 41. In use, when foam material is supplied at pressure to the passageway 41, it exudes through the port 113 into the arcuate slot 110 and from there flows over the surface 111 and spreads out throughout the relieved coat hanger shaped portion 42 of the die face 39 and the side of the shim 45 which is juxtaposed to the face 39 of the die half 32.

It will be appreciated that the slots 47 of shim 45 have upper ends which communicate with the lower portion of the coat hanger die area 42, just above the surface 112 thereof, so that fluid foam material can flow into the slots 47 and then downwardly to the extrusion outlet 40. In this manner, the coating material is spread throughout the coat hanger portion 42 and across each of the upper ends of the slots 47 of the shim 45 at significantly equal pressures, so that coating material can move through the extrusion slot 37 within the slots 47 of the shim 45 at relatively equal pressures.

As shown in FIG. 6, the foam material exudes through the slots 47 and then outwardly of the extrusion outlet 40.

Considering the advantages of the segmented shim 45, it will be appreciated that the width of the slots 47 between the projections 46 is preferably about twice the thickness of the shim. The thickness of one shim 45 may be about 0.004"0 while the slot width, i.e. from one projection 46 across to the next projection 46, is about 0.008". In another shim 45, for example, the shim thickness is about 0.008" while the segmented slot width between juxtaposed projections is about 0.016.

Accordingly, the overall slot thickness between die faces 38, 39 can be doubled while the die still produces the same basis weight coating as a prior slot die where the die slot is not segmented, as in this invention. Thus in a prior slot die where a slot thickness of 0.002" was needed for a small basis weight coating, the present invention can obtain the same basis weight coating with a slot thickness of 0.004", or doubled. Thus, the slot die according to the invention could pass a potentially clogging particle of 0.003" while the prior continuous slot die would not (for the same basis weight coating to be produced).

While the ratio of the slot width to the shim thickness is preferably about 2 to 1, this ratio can be varied to produce varying coating thicknesses.

It will be appreciated that the width and thickness parameters of the shims 45, 45a and their components can widely vary. The parameters may vary due to the basis weight of coating per square meter desired, the cohesiveness desired, the coating material viscosity or other factors.

In order to provide further description of one form of coat hanger portion 42, the surface 112 from face 39 back to surface 111 is about 0.020" wide. The tops of slots 47 are about 0.050" when the shim is operably disposed between faces 38, 39. The groove 110 at its deepest depth from face 39 is about 0.125" from face 39. The surface 111 at its top area is about 1/16" deep from face 111 and about 0.020" back from surface 39 at its bottom. The coat hanger width across face 39 is about 38 mm.

Turning now to the use of the apparatus described above, for the application of coatings to defined predetermined or discrete substrates, it will be appreciated that the apparatus is capable of impinging hot air from the slots 61 and 62 on each side of the foaming coating material exuding from the extrusion outlet 40. The impinging air engages the emerging expanse of coating material and carries it to a substrate as a layer of strip. Edge control is uniform and the density of the pattern can range from 25% open to 0% open, i.e. a film. The parameters are selected depending on the application to which the coatings are to be applied. The controller 75 is operational to start and stop the application of air to the extruded coating material at different times and/or intervals compared to the starting and stopping of the delivery of foam material to the extrusion outlet 40.

For example, in one preferred method of operation, the flow of air through the slots 61, 62 is started a short time prior to the time when the valve 76 is operated to initiate the delivery of foam coating material into the slot 37 and out through the outlet 40. The air is continued for the coating deposition. At the end of the deposition period, the valve 76 is first operated to cease the extrusion of coating material through the outlet 40. After a short delay, the flow of air through the slot 61 and 62 is stopped. While the amount of delay in such an operation will vary, depending upon the properties of the hot melt, such time period generally will preferably be on the order of micro seconds. One example would be, for example, 1700 micro seconds between the start up of the air and the start up of the extrusion of the hot melt material, and 2100 micro seconds between the stopping of the hot melt material and the stopping of the air. Continuation of the air flow much beyond this time might serve to pull off remaining foam material at the extrusion outlet and cause stringing of the deposited coating.

Moreover, it will also be appreciated that the invention contemplates the selective applications of air flow through either slot 61 or 62 individually or together during the deposition period, particularly to more accurately define the initial and ending contact position of the deposited coating on the substrate. One such mode of operation is illustrated in FIG. 5, where the apparatus is utilized, for example, to apply a discrete foam coating to a substrate in web form, for example. Such coatings can also be applied to discrete substrates, such as box flaps, or to irregular substrates.

In FIG. 5, a substrate web is shown at the left hand side of the figure at position F-1. As illustrated at F-1, air flow has been initiated through slot 61 but there is no foam coating material being extruded through the slot 37 and no air flow has started through the air slot 62. Moving to the web at the position F-2, it will be appreciated that the foaming fluid flow has started and that it is impinged by air flowing through slot 61. Since the air flowing through slot 61 moves downwardly in a general right to left direction as shown in FIG. 5, it will be appreciated that the coating material forms a sharp, square leading edge 121. Thereafter, and for most of the remainder of the coating operation, as shown in web position F-3, air flow is initiated through the slot 62, and continues through slot 61. At the end of the coating operation, the air flowing through slot 61 is terminated just before termination of the extrusion of the coating material (position F-4). Then, as shown in position F-5, the coating material flow has ceased, while the air flowing through slot 62 continues for a short time period thereafter. This operation ensures that the foam material forms a sharp, square trailing edge 122. Thus is formed a plurality of discrete foam coatings 123 on web 120 as illustrated in FIG. 6.

Accordingly, with respect to FIG. 5, the lag air is started first and stopped first and the lead air, that is, with respect to the machine direction of the application as shown in FIG. 5, is started after the extrusion of the coating material and stopped after the coating material extrusion has ceased. In this way, the air angling onto the foaming coating material does not blow it in strings over the web 120, as would be undesirable and yet the cut-off and cut-on edges of the coating material are maintained in sharp, square fashion on the web 120.

The invention is believed useful with a wide range of coating materials of different viscosities. It is important that the material supply pressure and return pressure be maintained in a relationship, such that the differences of the two pressures are not more than 1 BAR.

In addition, it is believed, based on current information, that a minimum flow rate is required to produce a uniform pattern with square and sharp cut-ons and cut-offs.

It will be appreciated that various sizes, spacings, pressures and selections of materials can be utilized. Thus, for example, the foam flow might be started at 2 mm of substrate movement after air start up, and the air flow stopped at 5 mm of substrate movement beyond extrusion shut off, for substrate speeds of about 70 meters/minute.

It will also be appreciated that the particular coating pattern produced by the apparatus and methods described above can either be porous or impervious, i.e. open or closed cell, and that the coating patterns are preferably produced in a discrete fashion on discrete substrates, for example, with good, square, sharp cut-on and cut-off and no stringing for the leading or trailing edges of the pattern, while at the same time, the sides of the pattern deposited are also parallel and sharp.

FIG. 7 illustrates the sharp edged, square coating patterns attainable with the invention. In FIG. 7, discrete foam coatings 170–173 have been applied by the invention to a substrate 174. Each discrete coating has two sharply defined side edges 175, 176, a sharply defined leading edge 177, and a sharply defined trailing edge 178. Sides 175, 176 are square to leading and trailing edges 177, 178. There is substantially no stringing.

Accordingly, the invention provides for intermittent non-contact foam coating operation with sharp, square-edged patterns and no stringing for a variety of applications, including lamination of the substrate to which the patterns are applied to some other substrate or component.

These and other modifications and advantages of the invention will become readily apparent to those of ordinary skill in the art without departing from the scope hereof, and the applicant intends to be bound only by the claims appended hereto.

We claim:

1. Apparatus for producing a foam coating for application to a substrate, said apparatus comprising:

a slot nozzle having an elongated slot outlet through which a foam coating material can be extruded;

valve means for controlling flow of foam material to said slot nozzle;

at least one air slot proximate said slot outlet for impinging at least one air stream onto a foaming coating material exuding from said slot outlet; and means for starting a flow of air prior to extrusion of foam coating material from said slot outlet.

2. Apparatus as in claim 1 further including means for stopping the flow of air after extrusion of foam coating material has ceased.

3. Apparatus as in claim 2 including at least two air slots, one proximate each side of said slot outlet for impinging air therefrom onto foam coating material exuding from said slot outlet.

4. Apparatus as in claim 3 further including means for delaying impinging air from one of said at least two air slots until after foam coating material exudes from said slot outlet and for continuing flow of air from said one of at least two air slots until after extrusion of said foam coating material has ceased.

5. Apparatus as in claim 4 further including means for initiating flow of air from the other of at least two air slots before foam coating material is extruded and for ceasing flow of air from said other of at least two air slots before extrusion of said coating material ceases.

6. Apparatus as in claim 1 further including means in said slot nozzle extending at least to said slot outlet for dividing said slot outlet into a plurality of slot outlets from which foam coating material exudes.

7. Apparatus as in claim 6 wherein said dividing means includes a shim having a plurality of juxtaposed elongated projections defining slots therebetween, said projections having tapered ends terminating at the outlet of said slot nozzle.

8. Apparatus as in claim 7 wherein two of the juxtaposed elongated projections have a distance between them of about twice a thickness of said shim.

9. Apparatus as in claim 7 wherein said projections of said dividing means extends outwardly beyond said slot outlet.

10. Apparatus as in claim 1 wherein said slot nozzle is disposed in a slot nozzle die comprising;

die halves defining an extrusion slot therebetween, said die halves having tapered projections with parallel inward facing surfaces forming said extrusion slot and tapered outer walls respectively partially defining inward surfaces of two air channels disposed at an angle with respect to said extrusion slot;

two air blocks, each having a tapered surface juxtaposed in operative disposition near one of said tapered outer walls such that one of said air channels is formed therebetween;

an air plenum in each said die block;

an air passage in each air block interconnecting an upper portion of each said plenum with a respective air channel; and an air passage in each air block for feeding air to a lower portion of each said plenum.

11. Apparatus as in claim 10, including an air passage in each die half, each die half air passage operationally interconnected with one of said air passages in said air blocks for feeding air to said plenum therein.

12. Apparatus as in claim 10 wherein said air passages for feeding air channel are defined by juxtaposed surfaces of said respective die halves and air blocks.

13. Apparatus as in claim 10 wherein said respective air plenums are defined by juxtaposed surfaces of said respective die halves and air blocks.

14. Apparatus as in claim 1 further including means in said slot nozzle, extending at least to said slot outlet, for dividing said slot outlet into a plurality of slot outlets from which foam coating material exudes; and wherein said foam material exuding from each said slot outlet merges into foam material exuding from adjacent slot outlets to form a continuous coating web prior to impingement of air thereon.

15. Apparatus as in claim 1 wherein said slot nozzle comprises a slot nozzle die having die faces defining an elongated channel for receiving and passing adhesive material therethrough;

said elongated channel terminating in said elongated slot outlet;

a shim disposed between said die faces in said channel, said shim having a plurality of elongated projections defining slots therebetween, said projections extending at least to said elongated slot outlet and defining between them a plurality of slot outlets through which foam material is extruded in a plurality of separate streams; and means for impinging a flow of air on foam material emanating from said slot nozzle die to produce a web of foam material.

* * * * *